March 16, 1965 C. H. KOEPPEL 3,173,462
HAND TOOLS AND HANDLES THEREFOR
Filed Feb. 12, 1962

INVENTOR.
CHARLES H. KOEPPEL
BY Lindsey, Prutzman and Hayes
ATTORNEYS

United States Patent Office 3,173,462
Patented Mar. 16, 1965

3,173,462
HAND TOOLS AND HANDLES THEREFOR
Charles H. Koeppel, North Woodbury, Conn., assignor to The Stanley Works, New Britain, Conn., a corporation of Connecticut
Filed Feb. 12, 1962, Ser. No. 172,511
4 Claims. (Cl. 145—61)

The present invention relates to tools and more particularly to a novel hollow plastic handle for tool elements having a shank engaged within a handle.

It is an object of the present invention to provide a rugged and economical tool having the shank of a tool element firmly supported within a hollow plastic handle.

It is also an object to provide lightweight hollow plastic handles which will provide firm and rugged support for the shank of a tool element when assembled therewith.

Another object is to provide a hollow plastic handle for receiving the shank of a tool element which is rugged and economical in construction and which may have a multi-colored or multi-shaded appearance as molded and which is adapted to facile variation in the external configuration.

Still another object is to provide hollow plastic handles wherein the wall thickness of the plastic material and the hollow portion may be readily varied and controlled to provide an ecomonical and high-strength unit and which will permit rapid assembly with the shank of a tool element to provide a durable support therefor.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

Figure 1:
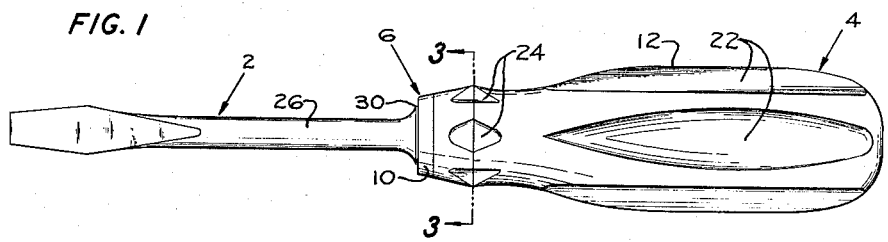
FIG. 1 is a side-elevational view of a screw driver embodying the present invention.

It has now been discovered that the foregoing and related objects can be attained by a hollow handle comprised of a tubular insert having an axial bore therein for receiving the shank and a hollow grip portion which is blow molded thereabout and in which interengaging means are provided on the grip portion and insert to prevent rotational and rearward axial movement of the insert relative to the grip portion. The shank portion of the tool element is then driven into the bore of the insert and firmly seated therein. Such a construction has proven itself economical and rugged and facile to manufacture and the insert is firmly engaged within the grip portion during the molding thereof and without adhesives, the shrinkage of the grip portion during cooling further increasing the bonding therebetween.

Referring in detail to FIGS. 1–4 of the attached drawings, the hand tool of the present invention is shown as embodied in a screw driver generally comprised of a screw driver blade 2 and handle 4. The handle 4 has a molded plastic insert 6 of generally tubular form with an axial bore 8 extending therethrough and a radial flange 10 at its outer end which abuts against the edge of the hollow grip 12.

Figure 4:
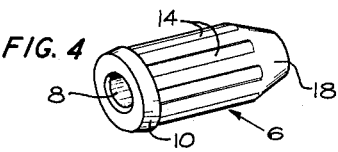
FIG. 4 is a perspective view of the insert used in the screw driver of FIGS. 1–3.
Figure 3:
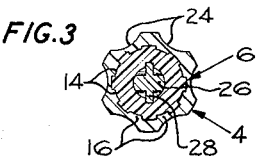
FIG. 3 is a transverse sectional view along the line 3—3 of FIG. 1.
Figure 2:
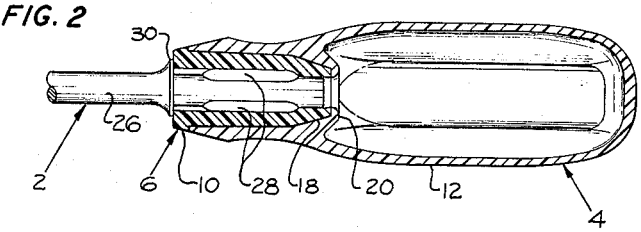
FIG. 2 is a fragmentary longitudinal section of the screw driver of FIG. 1.

As best seen in FIGS. 3 and 4, the tubular insert 6 has a plurality of axial grooves 14 in the periphery thereof into which the plastic of the molded grip extends to form interlocking ribs 16 which prevent relative rotational movement. The inner end of the insert has an inwardly tapering or bevelled neck portion 18 and the plastic at the insert end of the hollow grip is substantially solid so as to embed firmly the insert 6 therein and to provide an internal shoulder 20 locking behind the tapered neck portion 18. Thus, the insert 6 is prevented from rearward axial movement relative to the hollow grip 12 by the abutment of the flange 10 against the edge of the grip 12 and by the abutment of the neck portion 18 against the shoulder 20 as well as by the extremely tight-fitting frictional engagement between the juxtaposed side surfaces intensified by the shrinkage of the grip 12 onto the insert 6. In practice, the frictional engagement between the insert and grip is highly effective in preventing axial movement of the insert outwardly of the grip during normal use of the tools.

The body portion of the grip 12 is provided with longitudinal grooves 22 to facilitate gripping by the user, and the wall thereof is generally uniform in thickness. Smaller grooves 24 spaced about the periphery of the grip adjacent the blade end also facilitate gripping, particularly when it is desired to rotate the tool by finger movement.

The shank 26 of the tool element, which in the illustrated embodiment is the screw driver blade 2, is then driven into the bore 8 of the insert 6. To provide maximum retention and prevent rotation of the blade 2 within the insert 6, the rear end of the shank 26 is provided with a pair of longitudinally extending ribs 28 which embed themselves within the plastic of the insert. To limit movement of the blade rearwardly of the insert, the shank 26 is provided with a peripheral collar 30 which seats against the outer end of the insert 6.

Figure 5:
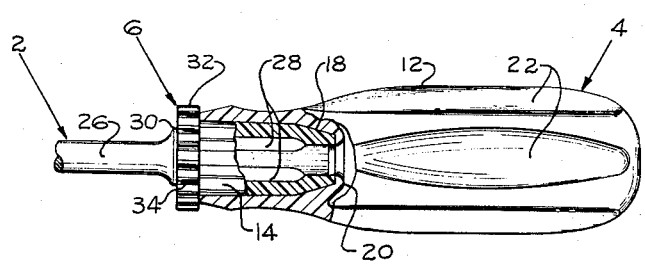
FIG. 5 is a fragmentary side-elevational view of a tool employing an alternative embodiment of the insert with portions of the handle and insert broken away.

The insert 6 may be molded in a variety of configurations. The flange 10 may be omitted entirely or it may be made of increased dimensions as illustrated in FIG. 5 wherein the insert 6 has a radial flange 32 of greater diameter than the end of the grip 12. The periphery of the flange 32 is provided with a multiplicity of axial grooves or flutes 34 to facilitate twirling or spinning the tool by finger action as in starting a screw.

Various thermoplastics may be used for the grip and insert, including cellulose acetate, cellulose butyrate, polypropylene, polyethylene, polystyrene, acrylic-butadiene-styrene copolymer, nylon and "Delrin." In practice, cellulose acetate has been found highly satisfactory and is preferred because of its combination of various properties.

Various combinations of colors may be employed for enhancing the appearance of the tool. For example, the insert may be of red and the grip blue or the grip may be transparent or translucent so that the color and/or outline of the body of the insert shows therethrough.

In making the handles of the present invention, the insert 6 is first supported within a die and a parison is formed thereabout which embeds the insert therein. The rod of the blow-molding pressure apparatus extends through the axial bore of the insert into the parison and air is injected thereinto under pressure to blow the thermoplastic material of the parison into the desired handle configuration which is defined by the configuration of the mold chamber.

As can be seen from the foregoing detailed description, the present invention provides a rugged attractive, and economical hollow handle for shanked tool elements which provides a firm seat therefor to ensure long-lasting life. The insert is firmly secured within the hollow grip portion without adhesives and in the molding operation itself, and the blow-molding technique enables the provision of an integrally formed grip portion of desired and variable wall thickness.

As will be apparent to persons skilled in the art, various modifications and adaptations of the structure above described will become readily apparent without departure from the spirit and scope of the invention, the scope of which is defined in the appended claims.

What is claimed is:

1. A hand tool comprising a hollow handle having a tubular plastic insert at one end thereof with an axial bore extending therethrough and a tensioned grip of molded plastic material embedding and compressively engaging said insert and extending rearwardly thereof, said grip having a generally cylindrical hollow portion rearwardly of said insert defining a chamber and providing a lightweight handle, said axial bore of the insert communicating with the chamber of said hollow portion, said insert having a portion of reduced cross section at its inner end and said grip having an inwardly extending flange of plastic material engaged with said portion of reduced cross section to prevent axial movement of said insert rearwardly of the grip, said insert and grip having interengaging self-locking ribs and grooves to limit relative rotational movement, said grip having tight-fitting surface engagement with said insert due to shrinkage thereof with the juxtaposed surfaces of said insert and grip being in intimate frictional contact; and a tool element having a shank portion secured within said axial bore of said insert.

2. A hand tool comprising a hollow handle having a generally cylindrical plastic insert at one end thereof with an axial bore extending therethrough and a tensioned grip of molded plastic material embedding and compressively engaging said insert and extending rearwardly thereof, said grip having a generally cylindrical hollow portion rearwardly of said insert defining a chamber and providing a lightweight handle and said axial bore of the insert communicating with the chamber of said hollow portion, said insert having axial grooves spaced about the periphery thereof and having a portion of reduced cross-section at its inner end, said grip having complementary portions of plastic material extending into said grooves of the insert to provide interengaging self-locking ribs and an internal flange of plastic material engaged with said insert portion of reduced cross section to prevent relative rotational movement therebetween and movement of the insert rearwardly of the grip, said grip having tight-fitting engagement with said insert due to shrinkage thereof with the juxtaposed surfaces of said grip and insert being in intimate frictional contact; and a tool element having a shank portion secured within said axial bore of said insert.

3. A hollow handle adapted to receive the shank of a tool element for producing hand tools, said handle having a tubular insert at one end thereof with an axial bore extending therethrough and a tensioned grip of plastic material embedding and compressively engaging said insert and extending rearwardly thereof, said grip having a generally cylindrical hollow portion rearwardly of said insert defining a chamber and providing a lightweight handle, said axial bore of the insert communicating with the chamber of said hollow portion, said insert having axial grooves spaced about the periphery thereof and said grip having complementary portions of plastic material extending into said grooves to provide interengaging self-locking ribs to limit relative rotational movement, and said grip having an inwardly extending flange engaging the inner end of said insert to prevent axial movement of said insert rearwardly of the grip.

4. A hollow handle adapted to receive the shank of a tool element for producing hand tools, said handle having a generally cylindrical plastic insert at one end thereof with an axial bore extending therethrough and a tensioned grip of molded thermoplastic material embedding and compressively engaging said insert and extending rearwardly thereof, said grip having a hollow portion rearwardly of said insert defining a chamber and providing a lightweight handle, said insert having a radial flange at its outer end closely fitting against the adjacent end of said grip and said axial bore communicating with the chamber of said hollow portion, said insert having axial grooves spaced about the periphery thereof and having a tapered neck portion of reduced cross section at its inner end, said grip having complementary portions of plastic material extending into said grooves to provide interengaging self-locking ribs and an internal flange extending behind said tapered neck portion to provide an abutting shoulder to prevent relative rotational movement therebetween and axial movement of the insert rearwardly of the grip, and said grip having tight-fitting engagement with said insert due to shrinkage thereof with the juxtaposed surfaces of said grip and insert being in intimate frictional contact.

References Cited in the file of this patent

UNITED STATES PATENTS

| | | |
|---|---|---|
| 1,888,222 | Curtis et al. | Nov. 22, 1932 |
| 2,202,253 | Hiatt | May 28, 1940 |
| 2,483,563 | Rock | Oct. 4, 1949 |
| 2,715,926 | Harris | Aug. 23, 1955 |
| 2,840,382 | Velepec | June 24, 1958 |
| 2,871,899 | Coyle et al. | Feb. 3, 1959 |
| 2,917,092 | Wetty | Dec. 15, 1959 |